(12) United States Patent
Kusama et al.

(10) Patent No.: US 7,733,791 B2
(45) Date of Patent: Jun. 8, 2010

(54) COMMUNICATION PATH MONITORING SYSTEM

(75) Inventors: Kazuhiro Kusama, Kawasaki (JP); Kiminori Sugauchi, Yokohama (JP); Minoru Koizumi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1195 days.

(21) Appl. No.: 10/313,599

(22) Filed: Dec. 5, 2002

(65) Prior Publication Data

US 2003/0165114 A1 Sep. 4, 2003

(30) Foreign Application Priority Data

Mar. 4, 2002 (JP) .............................. 2002-056729

(51) Int. Cl.
*G01R 31/08* (2006.01)
(52) U.S. Cl. .................. 370/252; 370/409; 370/522
(58) Field of Classification Search ................. 370/251, 370/252, 216, 256, 223, 235, 229, 351, 409, 370/522
See application file for complete search history.

(56) References Cited

U.S. PATENT DOCUMENTS

2002/0019866 A1* 2/2002 Linzy ........................ 709/223
2002/0143598 A1* 10/2002 Scheer ........................... 705/9
2003/0081556 A1* 5/2003 Woodall ...................... 370/241
2003/0081709 A1* 5/2003 Ngo et al. .................... 375/362

OTHER PUBLICATIONS

Trillium: Multiprotocol Label Switching (MPLS), IEC, Aug. 2, 2001.*
Riverstone: Encoding MPLS Labels, Riverstone Net, Nov. 20, 2001.*
Bernstein: Framework for MPLS-Based Control of Optical SDH/SONET Networks, IEEE, Jul./Aug. 2001.*
N. Brownlee, "Traffic Flow Measurement: Meter MIB," RFC 2720, Oct. 1999, Copyright © The Internet Society (1999), pp. 1-55.

* cited by examiner

*Primary Examiner*—Kevin C Harper
*Assistant Examiner*—Sai-Ming Chan
(74) *Attorney, Agent, or Firm*—Townsend and Townsend and Crew LLP

(57) ABSTRACT

The present invention provides an attribute value sampling device that obtains communication path establishing control information transmitted and received between data transfer devices, and sets monitoring on the basis of the communication path establishing control information. The attribute value sampling device obtains control information for establishing the communication path sent between the data processors, and extracts setting information relative to the obtaining the attribute value from the obtained communication path establishing control information, and obtains the attribute value from information passing through the path by using the extracted setting information.

10 Claims, 10 Drawing Sheets

FIG.8

| | | MONITORING CONDITION | | | | | | | |
|---|---|---|---|---|---|---|---|---|---|
| SESSION NAME | MONITORING POINT SPECIFYING INFORMATION | NOTIFYING OBJECT ITEM NAME | NOTIFYING DESTINATION | NOTIFYING PERIOD | PATH MESSAGE | PATH MESSAGE LATEST RECEIVED TIME | LABEL NUMBER | RESV MESSAGE | NECESSITY OR UNNECESSITY OF MONITORING |
| osakaTo Tokyo1 | hopCount==0 or is_lastHop | timestamped-Packets | 133.144.10.10 | every 30 sec | TIME_VALUE{ 60 } | 10:00:03 | 10001 | RECORD_ROUTE{ 10.20.1.1, 10.20.2.1 } | NECESSITY |
| osakaTo Tokyo1 | hopCount==0 or is_lastHop | transmitted-PacketCount, transmitted-ByteCount | 133.144.10.10 133.144.20.10 | every 1 min | TIME_VALUE{ 60 } | 10:00:03 | 10001 | RECORD_ROUTE{ 10.20.1.1, 10.20.2.1 } | NECESSITY |
| osakaTo Tokyo1 | anyHopCount | faultEvent | 133.144.10.10 133.144.20.10 | status changed | TIME_VALUE{ 60 } | 10:00:03 | 10001 | RECORD_ROUTE{ 10.20.1.1, 10.20.2.1 } | NECESSITY |
| osakaTo Tokyo2 | hopCount==0 or is_lastHop | transmitted-PacketCount, transmitted-ByteCount | 133.144.10.10 133.144.20.10 | every 1 min | TIME_VALUE{ 60 } | 10:00:15 | 10002 | RECORD_ROUTE{ 10.20.1.1, 10.20.2.1 } | NECESSITY |
| osakaTo Kanaza-wa1 | hopCount==0 or is_lastHop | transmitted-PacketCount, transmitted-ByteCount | 133.144.30.10 | every 2 min | TIME_VALUE{ 60 } | 10:03:03 | 10003 | RECORD_ROUTE{ 10.20.1.1 } | NECESSITY |
| osakaTo Kanaza-wa2 | hopCount==0 or is_lastHop | transmitted-PacketCount, transmitted-ByteCount | 133.144.30.10 | every 2 min | TIME_VALUE{ 60 } | 10:03:05 | — | — | UNKNOWN |

COMMUNICATION PATH MONITORING SYSTEM

BACKGROUND OF THE INVENTION

This invention relates to a network monitoring system for monitoring a communication path established on a communication network.

The development of network techniques such as IP (Internet Protocol), MPLS (Multi-Protocol Label Switching), etc., and content delivery techniques such as World Wide Web or Contents Delivery Network, etc. have enabled the use of a communication network as a delivery base for large capacity files such as a dynamic picture image, etc., and for streaming data. High reliability of the delivery base is indispensable to safe utilization of such a communication network as a social base, and the ability to monitor obstacles, construction, flow rate, performance and security of the communication path is also indispensable.

To monitor the communication path, it is necessary to obtain the states of a device constituting the communication network and the communication path virtually constructed by this device. Specifically, monitoring manager equipment (hereinafter "monitoring manager") and monitoring an agent device (hereinafter "monitoring agent") are used. The monitoring manager obtains state information of the communication path and a data processor using a management protocol such as SNMP (Simple Network Management Protocol, IETF RFC1157), CMIP (Common Management Information Protocol, X.711, ISO/IEC 9596-2), etc. from the monitoring agent connected to the communication path and data processor, and displays the state information.

To obtain the state information of the communication path, it is necessary to give the monitoring agent device, as a monitoring object, the following information: instructions about the communication path, a monitoring item, a method for notifying the monitoring manager, and a notifying frequency, as well as other information.

For example, IETF RFC2720 "Traffic Flow Measurement: Meter MIB measures traffic flowing through the IP network. However, it is necessary to assign the traffic flow as a measuring object in advance with respect to the meter as the monitoring device. Transmission/arrival IP addresses, a transport protocol classification, and transmission/arrival port numbers, are assigned.

In this case, the data processor is a device for transferring, accumulating and processing a data frame, a packet and contents. For example, the data processor includes a transmission device such as SDH (Synchronous Digital Hierarchy), etc., a packet transfer device such as an IP router, an MPLS switch, an asynchronous transmission mode (ATM) switch, etc., a computer such as a WWW server, a data cache, a load dispersion device, etc. The communication path is the flow of the IP network, a Label Switched Path of the MPLS, a session established via a proxy server between the WWW server and a client, etc.

The following procedures are carried out to monitor the communication network once the communication path is established by transmitting and receiving communication-path-establishing control information between the data processors using a conventional system. First, it is necessary for the monitoring manager to know through which data processor a certain communication path is formed within the communication network. Therefore, constructional information for the communication path is obtained from the data processor. Next, the monitoring manager determines a monitoring agent device for obtaining the attribute value of a monitoring object on the basis of the constructional information. The monitoring manager then gives the monitoring agent, as the monitoring object, the following information: instructions regarding the communication path, a monitoring item, a method for notifying the monitoring manager, a notifying frequency, etc. The monitoring manager collects the attribute value obtained by the monitoring agent device. Processing the collected data as a display on the screen of the monitoring manager equipment, etc. is performed with respect to the collected attribute value.

In this case, the attribute of the communication path is obstacle information such as the existence or nonexistence of an obstacle, etc.; constructional information such as a list of used resources, etc.; account information such as a passing or processed packet; the flow rate of contents, etc.; performance information such as a time required for the passage; a loss rate, etc.; security information such as the past record of an unfair establishing request of the communication path, etc. When the communication network is monitored by using the above method, the following problems are caused.

First, a large amount of management traffic is generated when the monitoring manager obtains the construction of the communication path from the data processor and sets the monitoring of the monitoring agent device. The processing load is concentrated on the monitoring manager. Second, a monitoring error is often caused since it is difficult to conform the period of the communication path establishment and the period of a monitoring start. Data can be instantly transferred after the communication path is established. However, the monitoring can be started only after the monitoring manager obtains the construction of the communication path, and the monitoring item, etc. are sent to the monitoring agent device. These processing times become a measuring error. In particular, this error becomes significant when a large amount of data is transferred for a short time, as in the remote backup of a large capacity file, etc., and the communication path is frequently established/opened as in WWW browsing. Third, is a case where the data processor is used in the communication path, i.e., the communication path is changed by autonomic switching processing of the data processor after the communication path is established. However, it is difficult to cope with this change in the conventional system. Accordingly, an improved monitoring method is needed.

BRIEF SUMMARY OF THE INVENTION

To solve the above problems, in the present invention a monitoring agent device obtains communication path establishing control information transmitted and received between data transfer devices, and monitoring is set on the basis of this information. Thus, the problems are solved as follows.

First, since no monitoring manager equipment is interposed in the monitoring setting, management traffic between the monitoring manager and the data processor is reduced. Management traffic between the monitoring manager and the monitoring agent is also reduced. Further, the processing load of the monitoring manager is reduced.

In general, the number of monitoring manager equipment is small compared to the data transfer devices, and in many cases, the monitoring manager equipment is arranged separately from the data transfer devices on a network. Since the monitoring agent device is arranged near the data transfer device, the number of cases causing of management traffic problems is small.

In the present invention, the monitoring agent device requires processing for receiving and analyzing the communication path establishing control information. However, since many monitoring agent devices are in the configuration of the present invention compared to the monitoring manager equipment, the number of cases in which problems occur is small.

Second, since monitoring is set in conformity with the establishment of the communication path, the disparity in time between the establishment of the communication path and the monitoring setting is small. Accordingly, a measuring error can be reduced even when a large amount of data is transferred for a short time and the communication path is frequently established/opened.

Third, even when the communication path used in the data processor is changed by autonomic switching processing of the data processor after the establishment of the communication path, the monitoring agent device connected to each of the paths before and after this change can know about this change by receiving the communication path establishing control information for the switching. Further, the monitoring manager equipment can easily accommodate the fact of the path change by setting attribute values sent by the monitoring agent device of a different path and the subject path to be relative to each other so that the monitoring can be continued.

BRIEF DESCRIPTION OF THE DRAWINGS

FIG. 8 is a view showing a monitored object table of the monitoring agent device.

DETAILED DESCRIPTION OF THE INVENTION

Figure 1:
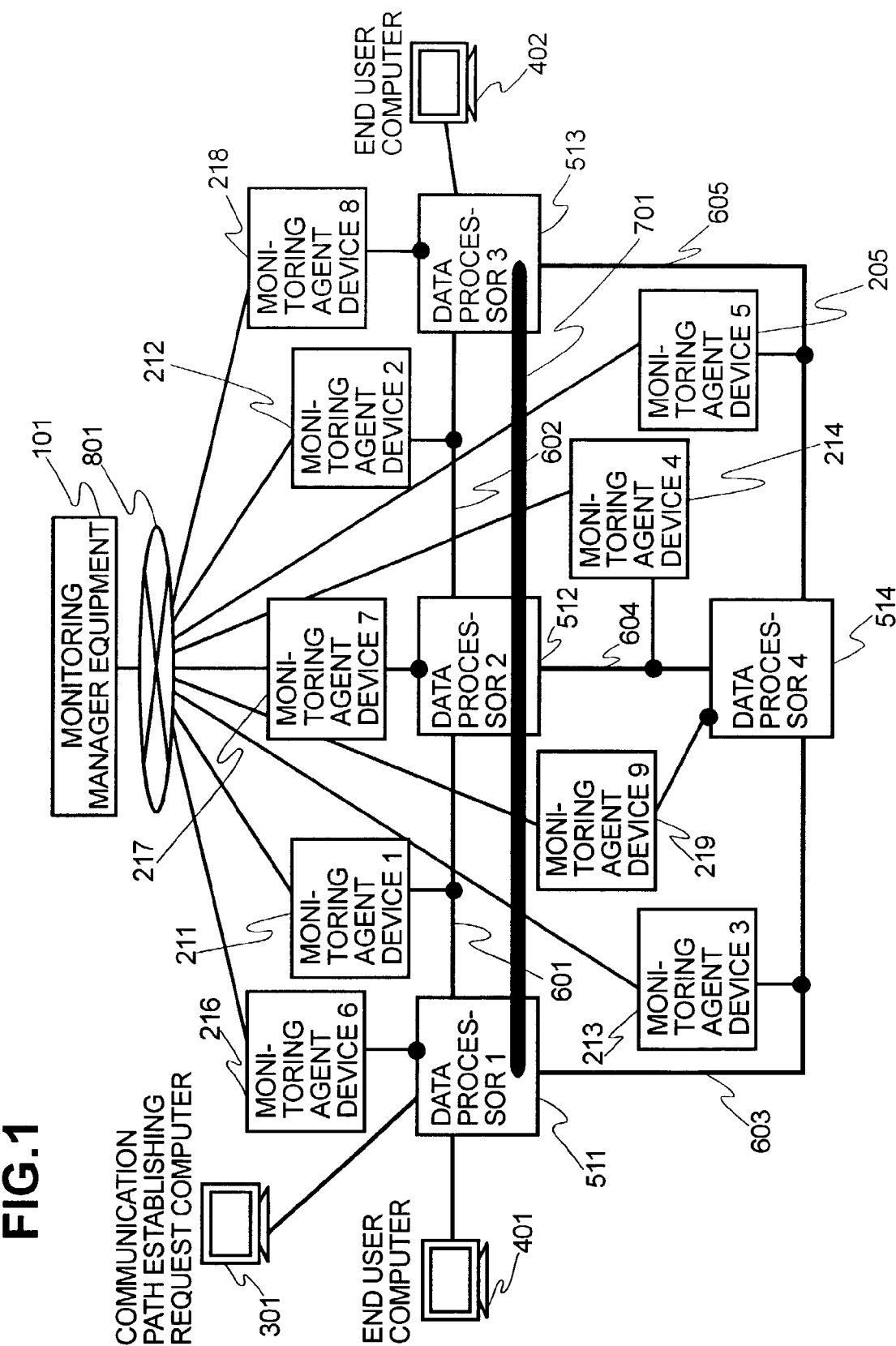
FIG. 1 is a view showing one configuration of an embodiment of the present invention.

The schematic construction and operation of a communication path monitoring system of an embodiment of the present invention is explained with reference to FIG. 1. In the system of this embodiment, at least one monitoring manager 101, at least one monitoring agent 211 to 219, at least one communication path establishing request computer, at least one end user computer 401, 402, and at least one data processor 511, 512 are mutually connected by transmission links 601 to 604 and a managing information transfer network 801. In FIG. 1, four data processors 511 to 514 are joined by five transmission links (601 to 605), but these processor and path numbers are arbitrary. Further, its joining topology is also arbitrary.

To perform mutual communication between certain two end user computers 401, 402, a communication path 701 is established between data processors 511, 513 connected to these end user computers. The end user computers 401, 402 communicate with each other by using the established communication path 701.

Monitoring agent devices 1, 2, 6, 7, 8 (211, 212, 216, 217, 218) are respectively connected to transmission links 601, 602 and data processors 511, 512, 513 through which the communication path 701 passes. Each monitoring agent device obtains control information mutually exchanged to establish the communication path 701 by the data processor 511, 512, 513 from each connection point, and performs a setting operation for monitoring data passing through the data processor 511, 512, 513 or the transmission links 601, 602 on the basis of the obtained control information. Each monitoring agent device obtains monitoring object information based on the setting, and notifies this result to the monitoring manager 101 via a managing information transfer network (801.

The embodiment is next explained as applied to an MPLS network controlled by RSVP-TE (Extensions to RSVP for LSP Tunnels, RSVP: Resource ReSerVation Protocol) specified by Internet draft of IETF "draft-ietf-mpls-rsvp-lsp-tunnel". This embodiment mode is called the present system. The schematic configuration and operation of the present system explained with reference to FIG. 1.

The MPLS network is constructed by mutually connecting at least one MPLS switch 511, 512, 513, 514, corresponding to the data processor of FIG. 1, by a transmission links implement mutual communication between two end user computers 401, 402, an LSP (Label Switched Path) 701 is established between an MPLS switch 1 (511) and an MPLS switch 3 (513) connected to these end user computers, and these computers communicate with each other by using the established LSP 701.

The communication path establishing request computer establishes the LSP 701 by issuing a path establishing request including the identification information of an LSP terminal point. In accordance with the procedure of RSVP-TE (Resource Reservation Protocol-TE), the MPLS switch 1 (511) next issues a PATH message toward MPLS switch 2 (512), and MPLS switch 2 (512) subsequently issues the PATH message toward MPLS switch 3 (513). In the following description, both the PATH message specified by the RSVP-TE and the PATH message enlarged by this embodiment are called the PATH message. The PATH message may include information for assigning at which point the monitoring is performed on LSP 701 in a portion enlarged by this embodiment in addition to the identification information of the LSP terminal point specified by the RSVP-TE, etc.

MPLS switch 3 (513) recognizes that this switch, itself, is an LSP terminal point, and transmits a RESV message to MPLS switch 2 (512) as a reply. In this case, MPLS switch 3 (513) assigns a label number to be used within the RESV message when MPLS switch 2 (512) transfers data on the LSP intended to be established to MPLS switch 3 (513). Similarly, MPLS switch 2 (512) issues the RESV message to MPLS switch 1 (511), and MPLS switch 1 (511) assigns the label number to be used in the transfer of the data on the LSP. Since MPLS switch 1 (511) is a starting point of the LSP, MPLS switch 1 (511) does not transfer the RESV-TE message to the others, but transmits completion of the establishment of the LSP to communication path establishing request computer as a reply.

In the present system, monitoring agent device 1 (211) and monitoring agent device 2 (212) as monitoring agent devices on the LSP path obtain LSP establishment control information of the RSVP-TE, i.e., the PATH message and the RESV message, and perform a setting operation required for monitoring. The monitoring agent device obtains monitoring object information on the basis of the setting, and notifies the monitoring object information to monitoring manager 101. Monitoring manager 101 collects the monitoring information such as a packet flow rate, the existence or nonexistence of an obstacle, etc., every LSP.

To perform the setting operation of the monitoring agent device, identification information of the monitoring agent device of a setting object, an item to be monitored, a method for notifying monitoring manager 101, a monitoring frequency, a notifying frequency, etc., are required. In the present system, the setting operation of the monitoring agent device is performed by the LSP establishment control information of the RSVP-TE with respect to at least one of these requirements.

If the monitoring agent device of the setting object is only assigned, it is sufficient to provide the PATH message specified by the RSVP-TE, and no enlargement of the PATH message is required. For example, an operation rule such as "if it is a first hop or the last hop, the number of passing packets of the LSP is totaled every ten seconds and notification is sent to the monitoring manager of IP addresses 133.144.100.100" is set in advance with respect to all the monitoring agent devices. Thus, the monitoring can be set with respect to only the required monitoring agent device with reception of the LSP establishment control information of the RSVP-TE as an opportunity. This means that that the monitoring agent device of the setting object is assigned by the LSP establishment control information of the RSVP-TE. On the other hand, when the field of the PATH message of the RSVP-TE is enlarged, the item to be monitored, the method for notifying monitoring manager 101, the monitoring frequency, the notifying frequency, etc. can be assigned by the LSP establishment control information of the RSVP-TE. Namely, these values can be set at every LSP.

Figure 2:
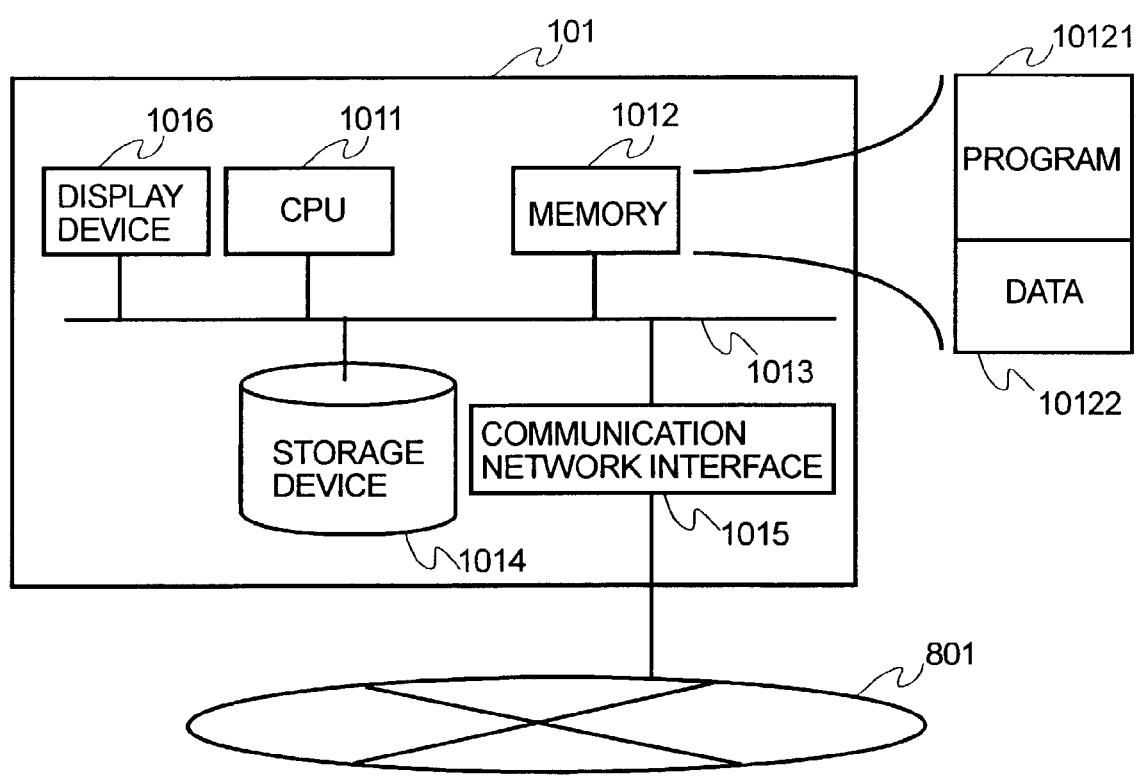
FIG. 2 is a block diagram of the hardware configuration of monitoring manager equipment.

The hardware configurations of the monitoring manager equipment 101 and the monitoring agent devices 211 to 219 are explained with reference to FIG. 2. Monitoring manager equipment 101 is composed of a CPU 1011, a memo 1012, an internal communication line 1013 such as a bus, etc., a secondary memory device 1014 such as a hard disk, etc., a communication network interface 1015 and a display device 1016. The communication network interface 1015 is connected to a managing information transfer network 801, and can communicate with monitoring agent devices 211 to 219 via this managing information transfer network 801. A program 10121 and data 10122 are stored in memory 1012 as needed.

Each of monitoring agent devices 211 to 219 has structural elements similar to those of monitoring manager equipment 101. Communication network interface 1015 is used to communicate with monitoring manager equipment 101 to obtain the communication path establishment control information and an attribute value (also called a monitoring value) as a monitoring object. Accordingly, multiple communication network interfaces 1015 may also be arranged as needed.

Figure 3:
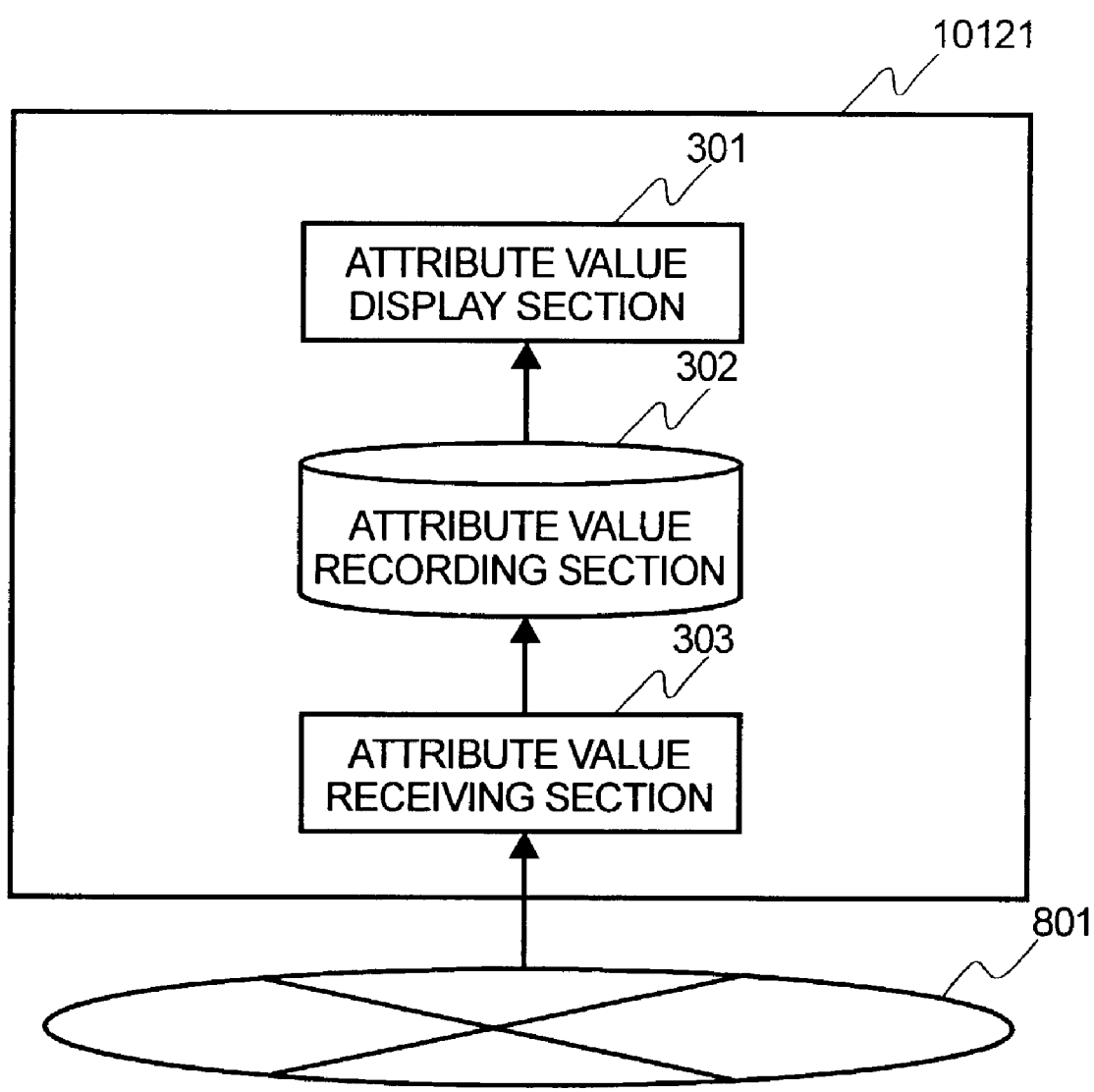
FIG. 3 is a view showing a software configuration of the monitoring manager equipment.

The structure of the monitoring manager 101 program 10121 is explained with reference to FIG. 3. Program 10121 for monitoring manager 101 is composed of an attribute value receiving section 303, an attribute value recording section 302 and a monitoring value display section 301. Attribute value receiving section 303 receives the attribute value from monitoring agent devices 211 to 219 via managing information transfer network 801, and stores this value in attribute value recording section 302. Monitoring value display section displays a monitoring result based on the attribute value stored in section 302 on a display device.

The software structures for monitoring agent device 211 connected to the transmission link and for monitoring agent device 216 connected to data processor 511 are explained with reference to FIG. 4. Monitoring agent devices 212 to 215 and monitoring agent devices 217 to 219 have equivalent software structures except that their connection destinations differ from each other.

Monitoring agent device 211 is composed of a control information receiving section 2111, an attribute value notifying section 2112, an attribute value recording section 2113, an attribute value sampling section 2114 and a monitored object table 220.

Control information receiving section 2111 is connected to transmission link 601 or data processor 511 obtains control information passing through the link or the data transfer device, stores a monitoring object item, a notification destination, etc. in monitoring object table 220, and starts attribute value sampling section 2114. Sampling section 2114 obtains the attribute value of a measuring object from data on the communication path 701 passing through transmission link 601 or data transfer device 511 on the basis of information described in monitored object table 220, and stores this attribute value in attribute value recording section 2113. Attribute value notifying section 2112 takes the attribute value from storage in recording section 2113 on the basis of information described in monitored object table 220, and transmits this attribute value to monitoring manager 101 via the managing information transfer network 801.

Figure 5:
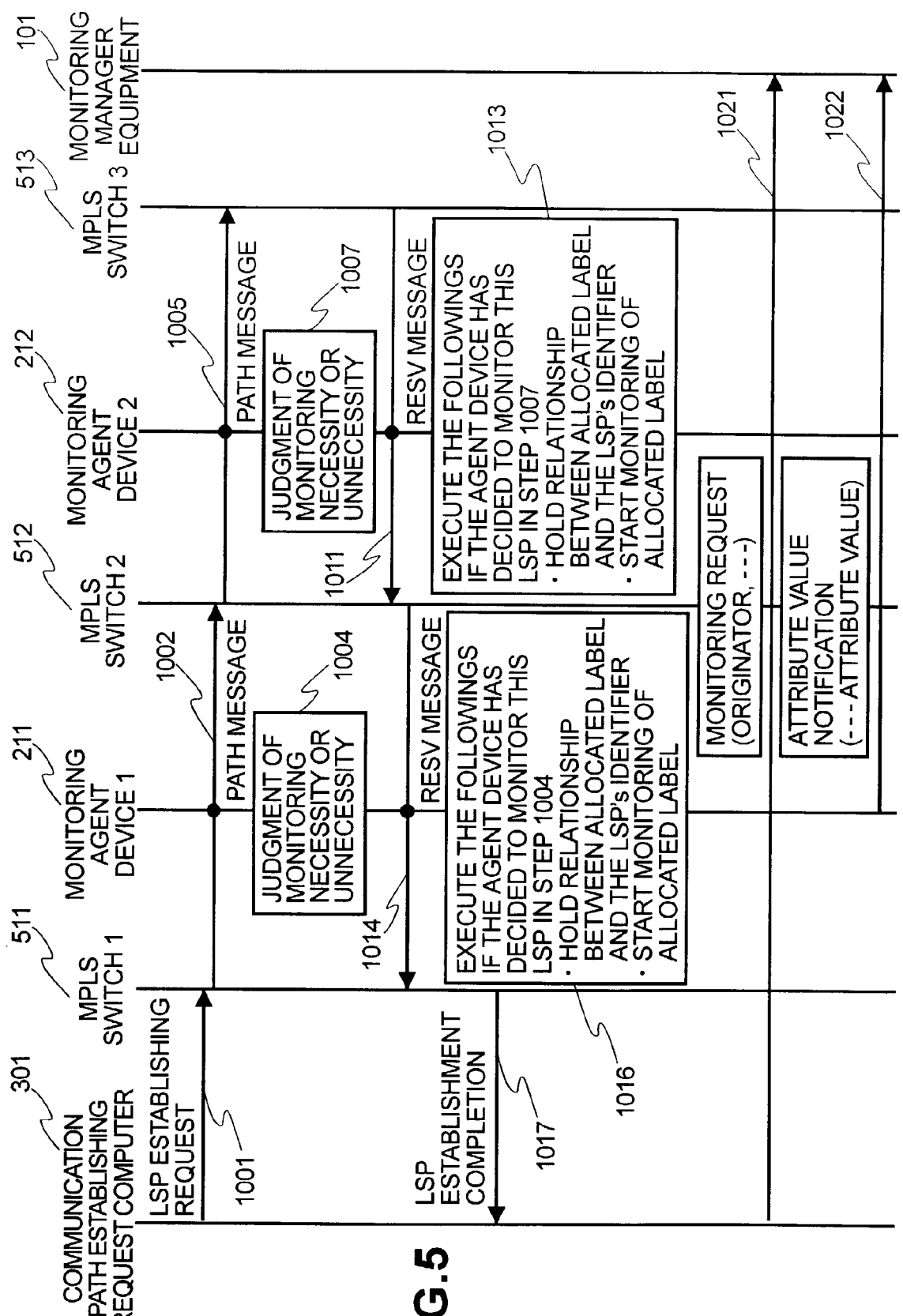
FIG. 5 is a view showing a situation in which monitoring with respect to the monitoring agent device is set in an LSP establishment sequence of the present system.

An example of setting the monitoring with respect to the monitoring agent device in an LSP establishment sequence of the present system is explained with reference to FIG. 5. To establish the LSP, communication path establishing request computer issues an LSP establishing request 1001 to MPLS switch 1 (511). MPLS switch 1 (511) receiving the LSP establishing request determines that the LSP is established in transmission link 1601 (of FIG. 1), and issues the PATH message 1002 to MPLS switch 2 (512) through transmission link 1 (601 of FIG. 1).

The PATH message may include information for assigning at which point the monitoring is performed on LSP 701 (as shown in FIG. 1) in a portion enlarged by this embodiment in addition to identification information at the LSP terminal point specified by the RSVP-TE, etc. In the following description, both the PATH message specified by the RSVP-TE and the PATH message enlarged by this embodiment are called the PATH message.

The details of contents of the PATH message will be explained later, using FIG. 6. After MPLS switch 2 (512) receives PATH message 1002, MPLS switch 2 (512) examines whether this MPLS switch itself is an end point of the LSP on the basis of the contents of the PATH message. As a result, MPLS switch 2 (512) concludes that this MPLS switch is not an end point, and determines the transmission link 2 (612) in which the LSP should be established. MPLS switch 2 (512) then issues PATH message 1005 onto transmission link 2 (612, not shown).

After MPLS switch 3 (513) receives PATH message 1005, the MPLS switch 3 (513) examines whether this MPLS switch itself is an end point of the LSP or not on the basis of the contents of the received PATH message. As a result, MPLS switch 3 (513) concludes that this MPLS switch is an end point, and issues 1011 the RESV message to MPLS switch 2 (512). The RESV message includes a label number to be used when MPLS switch 2 (512) transfers a packet flowing on the LSP to be established onto transmission link 2 (612, not shown).

After MPLS switch 2 (512) receives RESV message 1011, MPLS switch 2 (512) examines whether this MPLS switch itself is a starting point of the LSP to be established. As a result, MPLS switch 2 (512) concludes that this MPLS switch is not a starting point, and issues the RESV message to MPLS switch 1 (511) as an issuing source of the PATH message received by this MPLS on the basis of a PATH message issuing past record 1014.

After MPLS switch 1 (511) receives the RESV message 1014, the MPLS switch 1 (511) examines whether this MPLS switch itself is a starting point of the LSP. As a result, MPLS switch 1 (511) concludes that this MPLS switch is a starting point and notifies) completion of the establishment of the LSP 1017 to the communication path establishing request computer.

Details of the contents of the RESV message will be explained later using FIG. 7. Monitoring agent devices 1 (211), 2 (212) detect that the LSP is intended to be established on transmission links 1 (601), 2 (612) connected to these monitoring agent devices by obtaining copies of the PATH message and the RESV message passing through these transmission links.

When monitoring agent devices 1 (211), 2 (212) obtain the copies of the PATH messages 1002, 1005, these devices determine the necessity monitoring (1007, 1004) by looking at the monitoring point specifying information included in the PATH messages. If these monitoring agent devices 1 (211), 2 (212) decide that monitoring is necessary, they keep the contents of the respective PATH messages in the monitored object tables 220 located in each device to prepare for the receipt of the RESV message. The original PATH messages reach MPLS switches 2 (512), 3 (513) as the original destinations.

When monitoring agent devices 1 (211), 2 (212) obtain the copies of the RESV message 1011, 1014, the monitoring agent devices search the PATH messages corresponding to the RESV messages from the monitored object table 220, and set the monitoring. The original RESV messages reach MPLS switches 2 (512), 1 (511) as the original destinations.

Monitoring agent devices 1 (211), 2 (212) set the monitoring, subsequently automatically the monitoring (1021) according to the PATH message with respect to the label assigned by the RESV message, and send notification (1022) of the monitoring results to a notification destination assigned by the PATH message. In the notification, a session name assigned by the PATH message is added.

Figure 6:
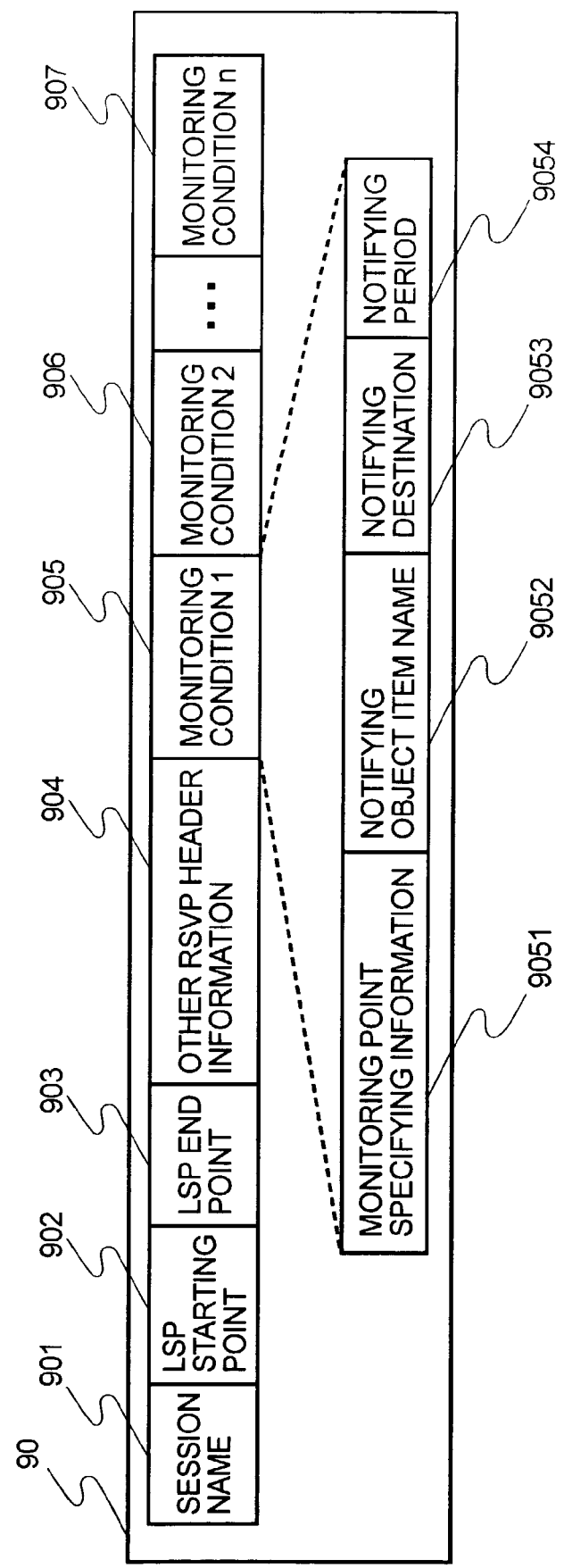
FIG. 6 is a view showing the format of a PATH message of the present system.

As shown in FIG. 6, the PATH message 90 is composed of information such as a session name 901, an identifier 902 at an LSP starting point, an identifier 903 at an LSP terminal point, and other header information 904 specified by the RSVP-TE, and an arbitrary number of monitoring conditions 905, 906 to 907 specified in this embodiment. The monitoring conditions are composed of monitoring point specifying information 9051, a notifying object item name 9052, a notifying destination 9053 and a notifying period 9054.

Figure 7:
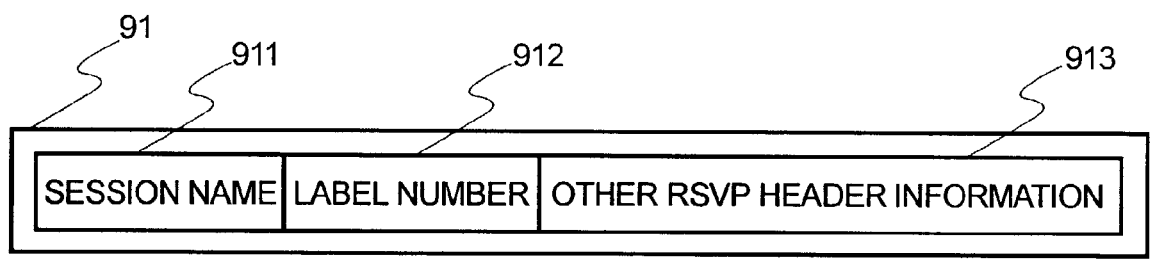
FIG. 7 is a view showing the format of a RESV message of the present system.

As shown in FIG. 7, the RESV message 91 is composed of a session name 911, a label number 912 and other header information 913. This label number is used when the MPLS switch, as an issuing source of the PATH message, transfers the packet of the LSP to be established. Processing of control information receiving section 2111 when monitoring agent 1211 receives PATH message 90 is explained next. Processing by monitoring agents 2 (212), 3 (213) and 4 (214) are similarly performed.

Figure 4:
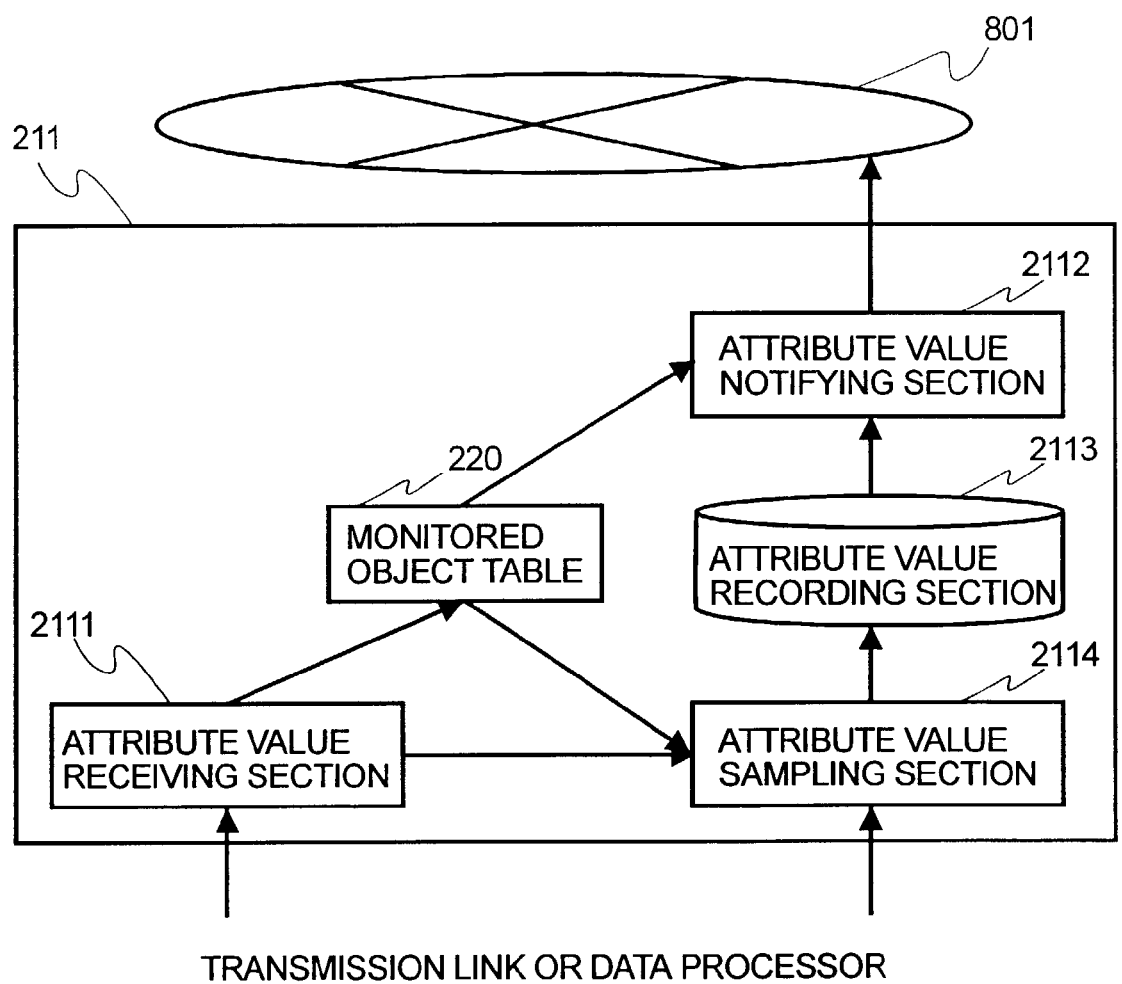
FIG. 4 is a view showing the software configuration of a monitoring agent device.

As can be understood from FIGS. 4, 6, and 7, when the control information receiving section 2111 of the monitoring agent gets PATH message 90, control information receiving section 2111 takes out the session name and the monitoring condition from this message, and stores that data in monitored object table 220 together with the receiving time for PATH message 90. The label column is set to a blank and the necessity of monitoring is set to unclear.

Session name 901 is a character series for identifying the LSP to be established and specified in the RSVP-TE. Monitoring point specifying information 9051, notifying object item name 9052, notifying destination 9053 and notifying period 9054 are enlargement fields in this embodiment.

Monitoring point specifying information 9051 directly or indirectly specifies an arbitrary number of monitoring agent devices for performing the monitoring. For example, monitoring point specifying information 9051 is "subnetAddress=133.144.0.0/16", "hopCount=1", "hopCount=LAST HOP", "media=SDH", "routerClass=GR2000", "anyHopCount", etc., respectively provided by coding "subnet address is 133.144.0.0/16", "it is first hop", "it is last hop", "transmission link classification is SDH", "router kind name is GR2000", "unconditionally", etc.

Notifying object item name 9052 is the name of a monitoring item to be notified to the monitoring manager 101. For example, notifying object item name 9052 is "faultEvent", "ifIpAddr", "transmittedPacketCount", "transmittedByteCount", "timestampedPackets", "waitingPacketCount", "loginEvent", etc., respectively provided by coding "obstacle event", "interface IP address", "passing packet number", "passing byte number", "all packets affixed by time stamp", "staying packet number within buffer", "log-in event", etc., by using, for example, an object identifier of SNMP. Another method can be also used in the coding. Notifying destination 9053 is identification information for the monitoring manager 101 of the notifying address for a monitoring result. For example, an IP address can be used as the notifying destination 9053. Notifying period 9054 is information showing the notifying period of a monitoring result, and is one or more combinations of a first notifying time, a notifying interval and the number of notifying times.

The monitoring item of monitored object table 220 stored in by each monitoring agent is explained with reference to FIG. 8. Each of the monitoring agents 211 to 219 has a monitored object table 220 therein, and has a session name column 2201, a monitoring condition column 2202, a PATH message column 2203, a PATH message final receiving time column 2204, a label number column 2205, a RESV message column 2206 and a monitoring necessity column 2207. Each row is a monitoring condition field 905 to 907 specified by PATH message 90. For example, when two monitoring condition fields are required in one PATH message 90, two rows are added to this table.

The monitoring condition column is subdivided and made up of a monitoring point specifying information column 22021, a notifying object item name column 22022, a notifying destination column 22023, and a notifying period column 22024. Information regarding monitoring point specifying information 9051, notifying object item name 9052, notifying destination 9053 and notifying period 9054, all of which constitute monitoring condition field 905 of PATH message (90) are stored to these respective columns.

The values of corresponding fields from PATH message 90 stored in session name column 2201 and monitoring condition column 2202. The value of other header information 904 of the PATH message 90 is stored in PATH message column 2203. The receiving time of this PATH message is stored in PATH message final receiving time column 2204. In the RSVP-TE, a PATH message of the same session name is periodically transmitted from the LSP starting point to maintain an LSP establishing state, but the receiving time of the final message among a series of these PATH messages is stored in this column, Path Message Latest Received Time 2004.

The label number 912 received by RESV message 91 is stored in label number column 2205. The value of the other header information 913 of RESV message 91 is stored in RESV message column 2206. An assessment of whether it is necessary or unclear to monitor the LSP assigned in this row is stored in monitoring necessity column 2207. The value of this column is necessary or unclear.

Figure 9:
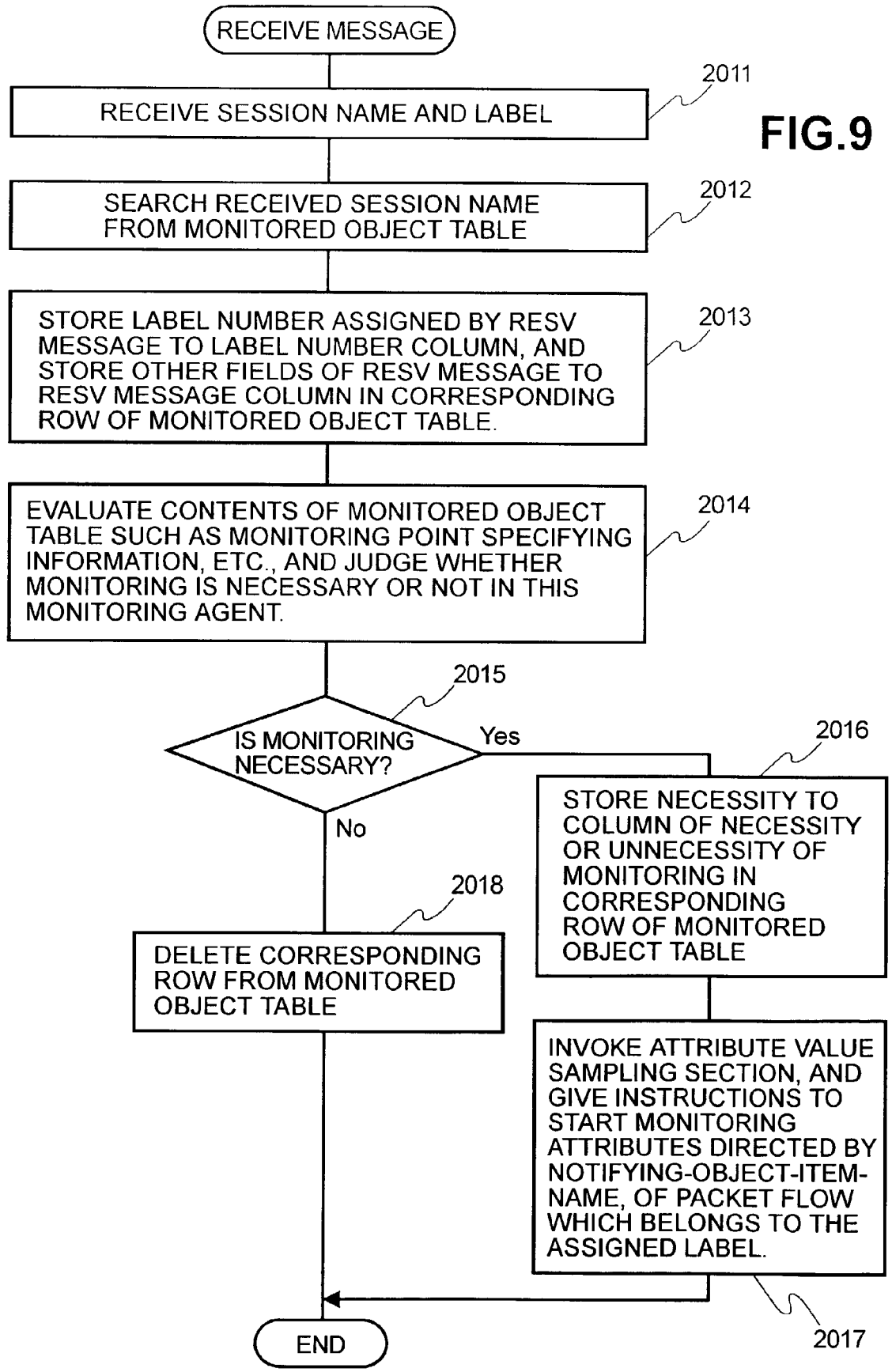
FIG. 9 is a flow chart showing processing of the monitoring agent device when receiving a RESV message.

Processing of the control information receiving section of monitoring agent 1 (211) in getting RESV message 91 is explained with reference to the flow chart of FIG. 9 and the table of FIG. 8. Monitoring agents 2 to 9 (212-219) also perform similar processing. When the monitoring agent 1 (211) receives RESV message 91, monitoring agent 1 takes out 2011 the session name and the label number, and searches 2012 this session name in the monitored object table shown in FIG. 8. If there is a row having this session name, monitoring agent 1 stores 2013 the label number and the other fields of the RESV message, respectively, in label number column 2205 and RESV message column 2206 of the table.

Monitoring agent 1 decides 2014 whether it is necessary to monitor this LSP by evaluating the items in the rows of Monitoring Point Specifying Information 22021 and the three other columns that constitute the monitoring condition[s]. The specific decision method depends on the classification of the terms of a logic formula of the monitoring point specifying information. For example, if the monitoring point specifying information of "hopCount==LAST HOP" is assigned, RECORD ROUTE object of the RESV message column is referred. If this record length is 1, it is considered that monitoring is necessary. The RECORD ROUTE object is an object specified in RSVP-TE and is a list of IP addresses of the interface through which the LSP passes from the transmission interface of this RESV message to an LSP end point on the LSP to be established. For example, if the monitoring point specifying information of "anyHopCount" is assigned, it is determined at any time that monitoring is necessary.

If it is monitoring considered necessary 2015, the command of necessity of monitoring is stored in monitoring necessity column 2016, attribute value sampling section is started 2017, and a monitoring start of the item assigned by the notifying object item name is instructed with respect to the label in the label number column. If monitoring is considered unnecessary 2015, the corresponding row is deleted 2018 from the monitored object table.

Figure 10:
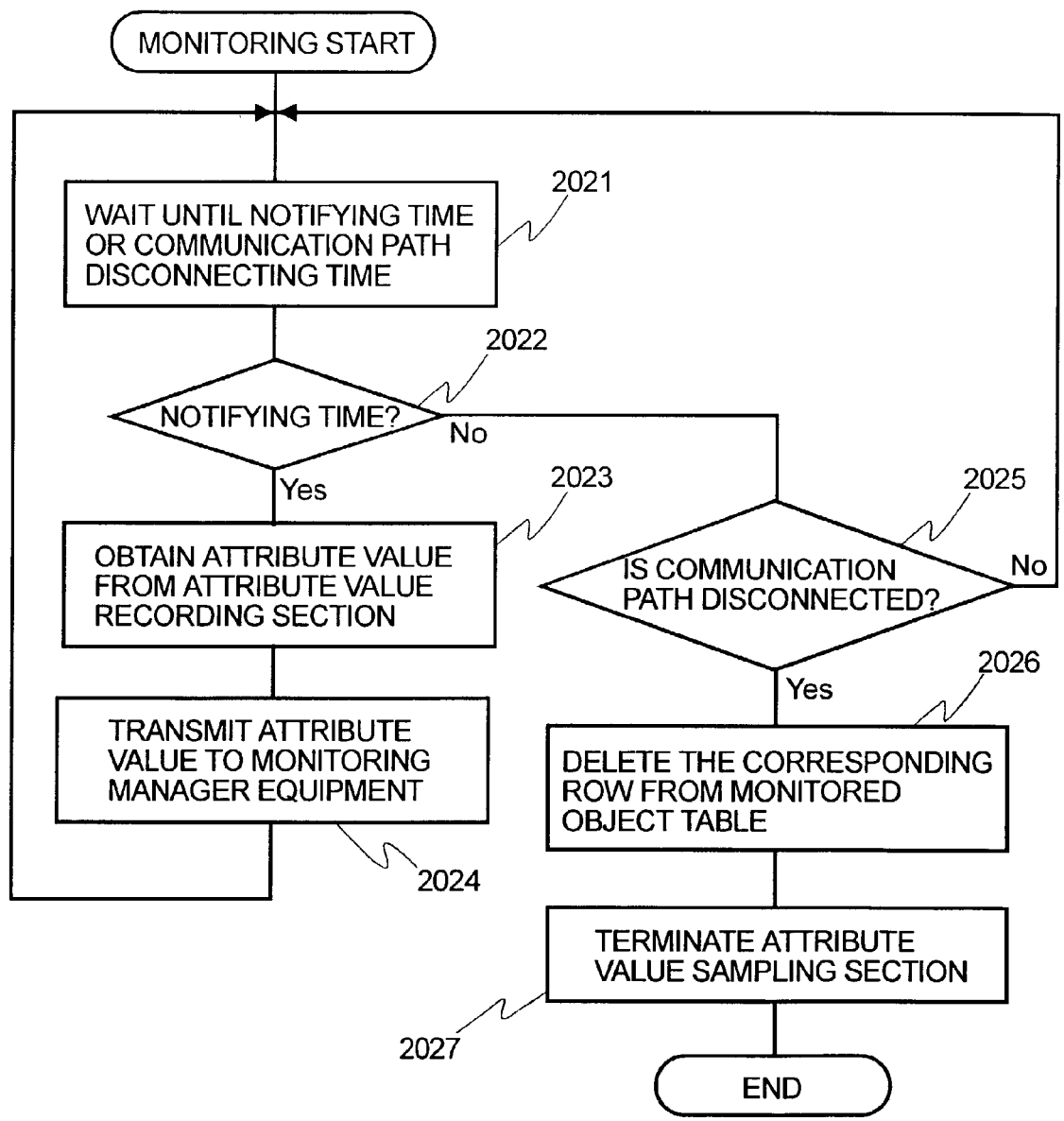
FIG. 10 is a flow chart showing attribute value notification processing of the monitoring agent device.

Next, processing of the attribute value notifying section 2112) of monitoring agent 1 (211) is explained with reference to FIG. 10 and monitored object table 220 of FIG. 8. Monitoring agent devices 2 to 9 (212-219) perform similar processing. This processing is individually executed with respect to all rows, among the respective rows of the monitored object table, in which monitoring has been deemed necessary. A standby state is set until the notifying time or communication path disconnecting time arrives 2021.

The notifying time is derived from the evaluation of notifying period column 22024 of the monitored object table. The communication path disconnecting time is derived from the values of the TIME_VALUE field of the PATH Message final receiving ["Latest Received"] Time column and the PATH Message column of the monitored object table. The TIME_VALUE field is a value specified by RSVP-TE, and shows an interval for periodically refreshing the LSP with the PATH message. The time-out of the refreshing means disconnection of the LSP.

If the notifying time has arrived 2022, the attribute value is obtained from the attribute value recording section 2023, the attribute value is transmitted to the monitoring manager assigned by the notifying destination column 22023 of the monitored object table, and it is returned to processing 2024. If, instead, the communication path disconnecting time has arrived 2025, the corresponding row is deleted 2026 from the monitored object table, and the operation of attribute value sampling section is terminated 2027.

Processing of the attribute value sampling section of monitoring agent device 1 (211) connected to the transmission link 601 is explained with reference to FIGS. 1, 4, 8. As mentioned above, and referring back to FIG. 4, attribute value sampling section 2114, is started when control information receiving section 2111 decides that monitoring is necessary. The operation of attribute value sampling section 2114 is terminated when the attribute value notifying section determines the disconnection of the communication path 2027, as shown in FIG. 10.

The attribute value sampling section is started once every row of the monitored object table 220, shown in FIG. 8, receives a packet having a label described in label number column 2205 from the transmission link 601 (FIG. 1), and stores characteristic information of the packet in attribute value recording section (2113) (FIG. 4) in accordance with the contents described in the notifying object item column (22022). The classification of the stored characteristic information, the stored frequency and the stored trigger depend on the described contents of the notifying object item column, and its corresponding relation is programmed, in advance, in the attribute value sampling section (2114) as hardware or software. For example, if it is described as time stamped Packets, the obtaining time for all the packets is provided in the MPLS header information, and is stored in the attribute value recording section. With respect to monitoring agents 2 to 5, similar processing is performed except that the above monitoring data obtaining destination is replaced by the connection destination for each agent device.

When each of the monitoring agents 6 (216) to 8 (218) is connected to the data processor (MPLS switch in this embodiment), the monitoring agents obtain the packets passing through MPLS switches 1 (511) to 3 (513) respectively connected to the monitoring agents, and store the packets to the attribute value recording section 2113

It will next be explained, with reference to FIG. 1, that monitoring manager 101 can easily continue the monitoring LSP 701 even when the path of LSP 701 is changed by the generation of an obstacle in transmission link 1 (601), etc., in the above embodiment. In accordance with RSVP-TE, MPLS switch 511 as a starting point of the LSP confirms that no obstacle is generated in the path of the LSP, i.e., in the MPLS switch and the transmission link through which the packet passes, by repeating a procedure similar to that carried out when establishing the LSP. MPLS switch 1 (511) periodically sends the PATH message to MPLS switch 2 (512), and confirms that the corresponding RESV message replies. If the RESV message does not reply, MPLS switch 1 (511) as the starting point of the LSP considers the lack of response as the generation of an obstacle in the LSP.

In this case, many MPLS switches generally try the establishment of the LSP passing through a separate path. Namely, the PATH message is propagated from MPLS switch 1 (511) to MPLS switch 3 (513) via MPLS switch 4 (514) by a procedure similar to that used at the establishing time of the LSP addressed to MPLS switch 3 (513) via MPLS switch 2 (512). The RESV message with respect to this PATH message is returned from MPLS switch 3 (513) to MPLS switch 1 (511) via MPLS switch 4 (514). Thus, a new path is established with respect to the same LSP.

The PATH message and the RESV message in this procedure can be detected by monitoring agent 3 (213), monitoring agent 9 (219) and monitoring agent 5 (215). Further, monitoring manager (101) can easily know that the attribute value notified by the monitoring agent before the path change and the attribute value notified by the monitoring agent after the path change are the attribute value in the same LSP by setting the session name 901 to the same name in the communication path before and after the path change. Accordingly, the monitoring can be continued without interruption even when the path is switched.

In accordance with this embodiment, since no monitoring manager is interposed in the monitoring setting, the monitoring traffic between the monitoring manager equipment and the data processor, and the monitoring traffic between the monitoring manager equipment and the monitoring agent device[s] is reduced. Further, the processing load of the monitoring manager is reduced.

Since the monitoring setting is completed in synchronization with the establishment of the communication path, a measuring error can be reduced even when a large amount of data is transferred for a short time and the communication path is frequently established/opened.

Further, even when the data processor used in the communication path is changed by the autonomic switching processing of the data processor after the establishment of the communication path, monitoring can be continued since the monitoring agent can easily receive and accommodate this change.

The present invention has the effect of reducing the processing load applied to the monitoring setting, reduces the time delay to measuring start, and facilitates being able to follow a communication path change. It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A communication path monitoring system for monitoring a communication path established through a transmission link for connecting two data processors, comprising:
an attribute value sampling device for sampling an attribute value of the communication path as a monitoring object, the attribute value sampling device being coupled to the transmission link or one of the data processors; and
wherein the attribute value sampling device:
obtains control information for establishing the communication path, the control information being exchanged between the two data processors,
extracts setting information relative to obtaining of the attribute value from the communication path establishing control information if the control information is obtained,
obtains the attribute value from information passing through the communication path by using the extracted setting information,
establishes monitoring of the communications path synchronously with the establishment of the communications path if the attribute value is obtained, and
in response to a change to the communications path, modifies the monitoring of the communications path synchronously with the change to the communications path.

2. The communication path monitoring system according to claim 1, further comprising a monitoring manager wherein the attribute value sampling device transmits the obtained attribute value to the monitoring manager; and
the monitoring manager receives and stores the attribute value.

3. The communication path monitoring system according to claim 2 wherein:
the data processor monitors a path state of the communication path, and establishes the communication path in accordance with the path state; and
the attribute value sampling device transmits an attribute value before and after a change of the communication path; and
the monitoring manager receives and stores the attribute values from the attribute value sampling device for different paths.

4. The communication path monitoring system according to claim 3 wherein the attribute value sampling device obtains a classification of the attribute value based upon control information sent between data processors.

5. The communication path monitoring system according to claim 4 wherein:
the communication path establishing control information includes monitoring point specifying information and/or monitoring object attribute information, and
the attribute value sampling device extracts at least one of the monitoring point specifying information and the monitoring object attribute information included in the communication path establishing control information, and determines at least one of (1) necessity of obtaining an attribute value and (2) a classification of the attribute to be obtained.

6. The communication path monitoring system according to claim 5 wherein:
the communication path establishing control information includes at least one of notifying destination information and notifying period information, and
the attribute value sampling device extracts the notifying destination information and/or the notifying period information from the communication path establishing control information, and determines the notifying destination and/or the notifying period of the attribute value.

7. The communication path monitoring system according to claim 6, wherein the attribute value sampling device obtains the attribute value from the data processor.

8. The communication path monitoring system according to claim 7, wherein the attribute value includes at least one of obstacle information, constructional information, a data flow rate, and information obtained by adding a time stamp to header information of passing data.

9. The communication path monitoring system according to claim 8 wherein:
the data processor is an MPLS switch or a router, and
the monitoring object communication path is an RSVP flow established by RSVP protocol, or an LSP established by LDP protocol.

10. The communication path monitoring system according to claim 8 wherein:
the data processor is a server for processing HTTP protocol or SMTP protocol, and
the communication path is a session of the HTTP protocol or the SMTP protocol.

* * * * *